March 4, 1969  W. J. BURKE  3,430,359
APPARATUS WITH HEAT CONDUCTIVE BELT
Filed Feb. 9, 1967  Sheet 1 of 3
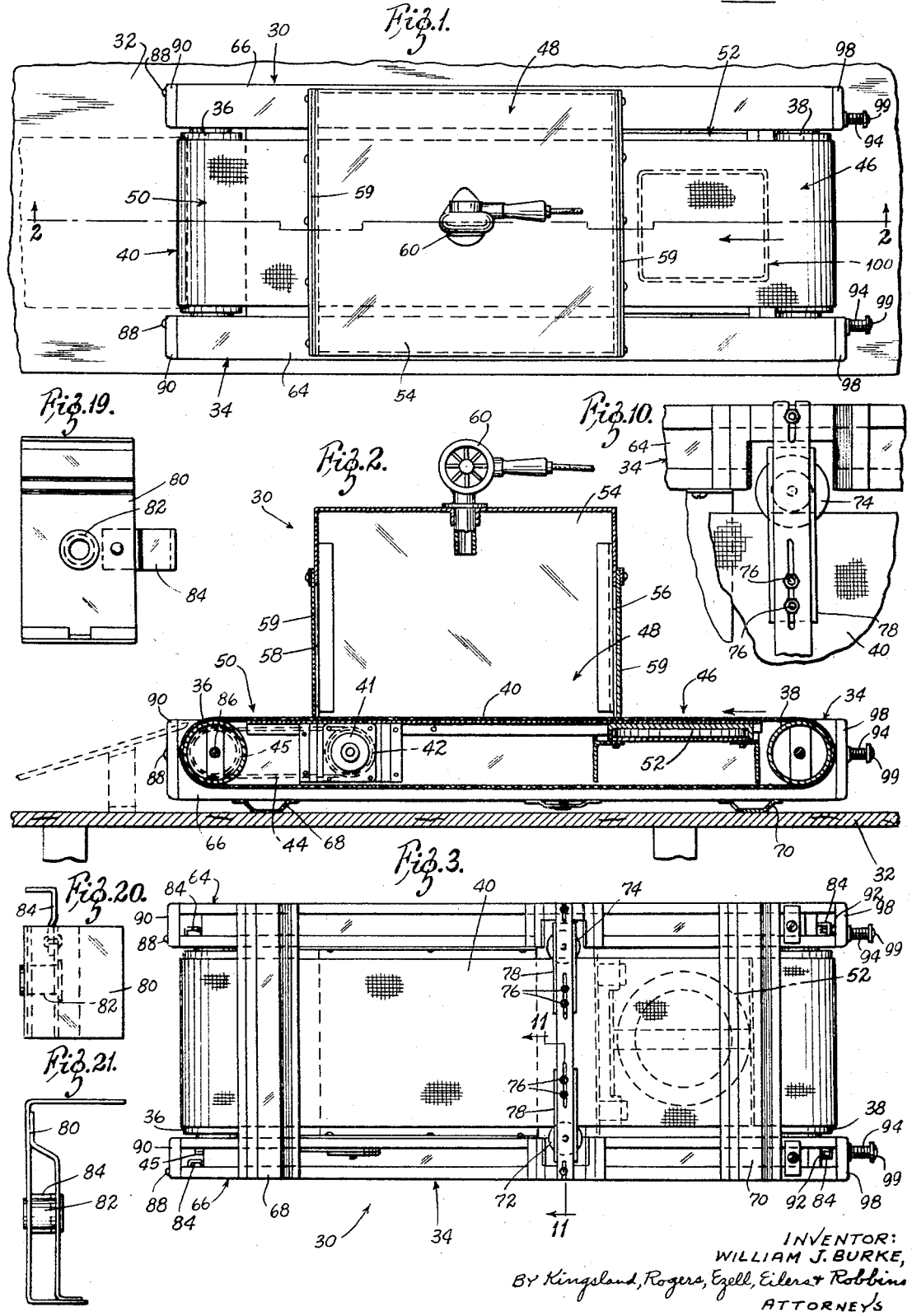
INVENTOR:
WILLIAM J. BURKE,
By Kingsland, Rogers, Ezell, Eilers & Robbins
ATTORNEYS

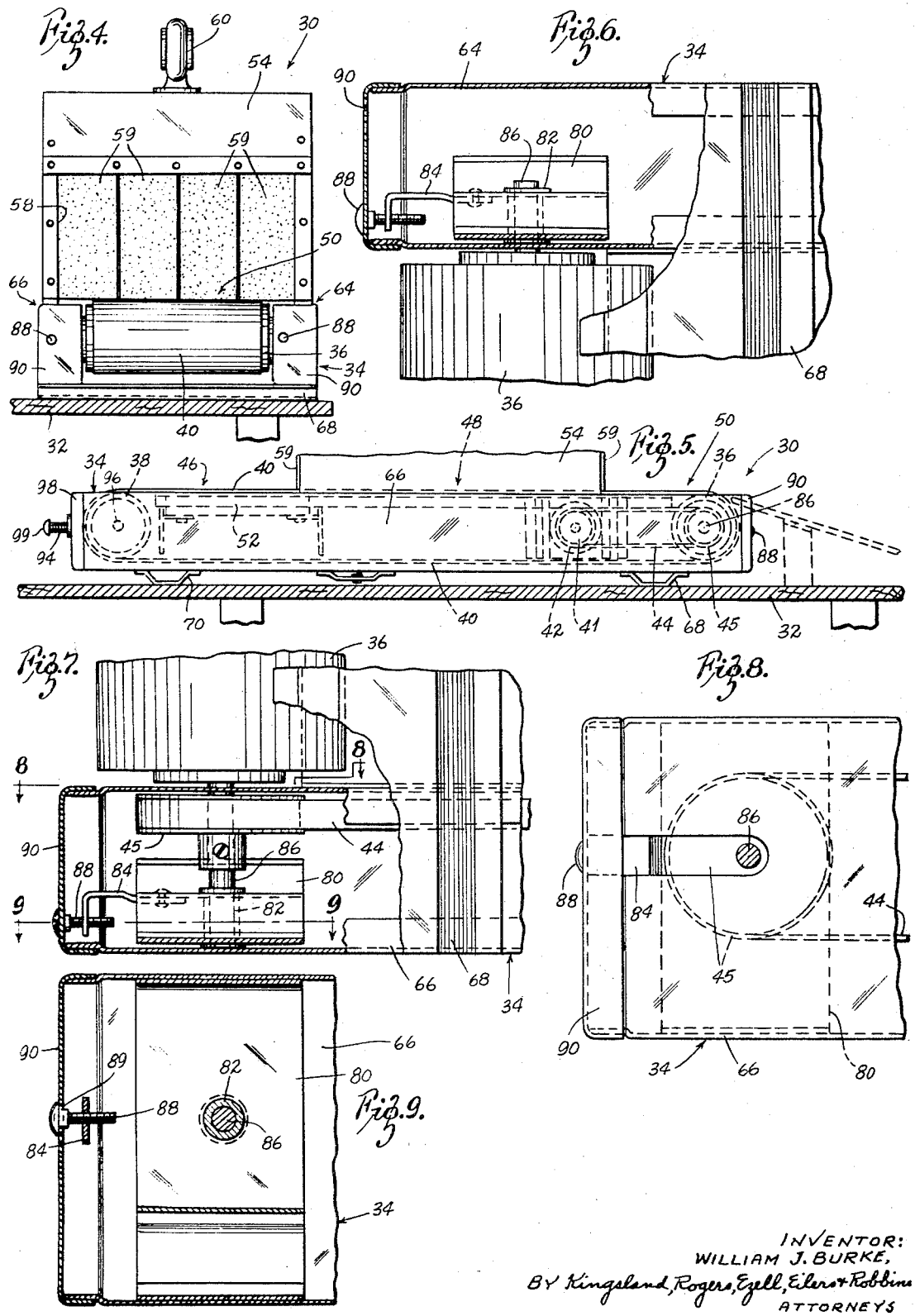

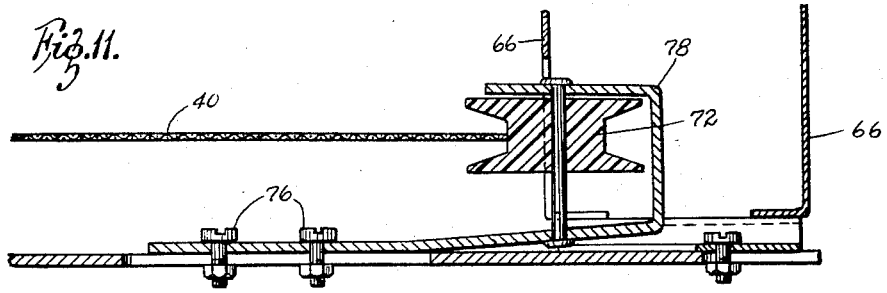
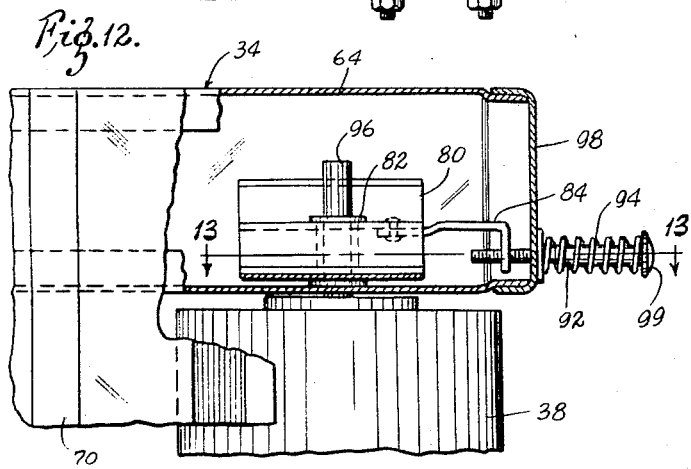
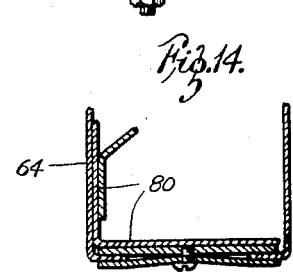
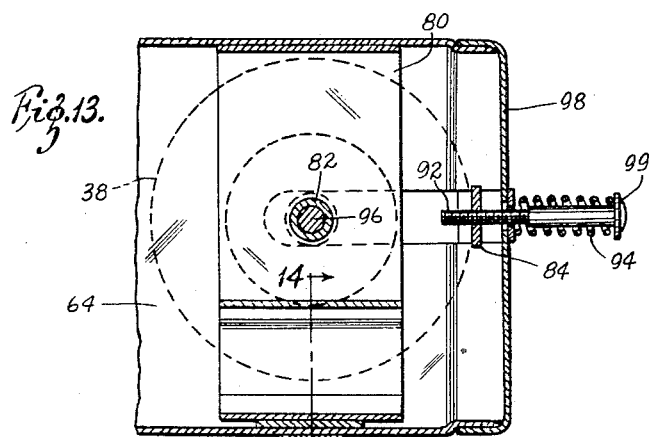
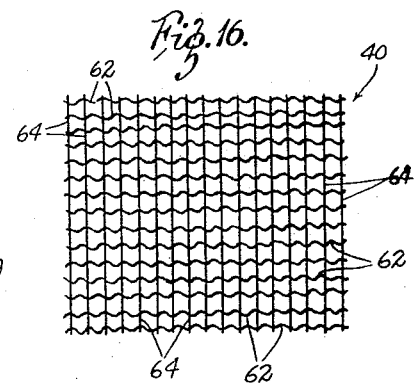
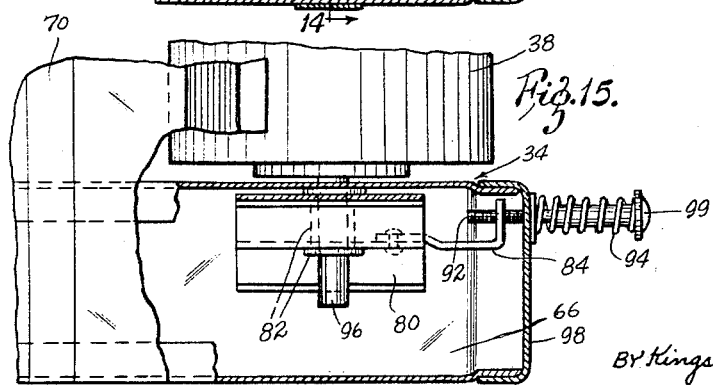
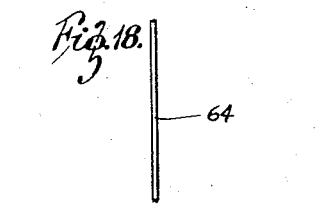
INVENTOR:
WILLIAM J. BURKE,
BY Kingsland, Rogers, Ezell, Eilers & Robbins
ATTORNEYS

United States Patent Office 3,430,359
Patented Mar. 4, 1969

3,430,359
APPARATUS WITH HEAT CONDUCTIVE BELT
William J. Burke, Ladue, Mo., assignor to Roll-O-Sheets, Inc., St. Louis, Mo., a corporation of Missouri
Filed Feb. 9, 1967, Ser. No. 615,003
U.S. Cl. 34—225    4 Claims
Int. Cl. F26b 25/06, 21/00

ABSTRACT OF THE DISCLOSURE

Apparatus for heat shrinking plastic wrapping film about objects of one type or another, such as packages and produce, in which the apparatus is provided with a metallic heat conductive in which the belt has a slight degree of longitudinal elasticity. A heat platen is positioned underneath the belt in heat conductive relation to heat the belt so that articles wrapped with plastic film may be heated to tack the edges of the film together by heat shrinking operations, after which the partially wrapped package is fully heat shrunk in passing through a heat tunnel. The metallic belt has longitudinal metallic strands having a longitudinal spring action which maintains the belt upon a biased roller and a driven roller thereby maintaining tension on the belt. The spring action of the belt and the biasing action of the rollers prevent the belt from being damaged and will also maintain it in proper relationship on the rollers.

The prior art

Portable heat shrinking apparatus has been provided in the past such as that shown in Burke Patent No. 3,164,-939, granted Jan. 12, 1965, and assigned to Roll-O-Sheets, Inc. Such apparatus is useful in heat shrinking film about various objects such as food, sandwiches, and other objects. Such apparatus has generally employed flexible rubber or plastic belts which provide poor heat transfer properties. Metallic belts have found objection because of the tendency to wear or crack and untrack due to the continual flexing as they pass around pulley wheels or rollers.

Summary of the invention

It is a feature of the instant invention that improved heat transfer means is provided through a metallic heat transferring belt which is flexible and has a slight degree of longitudinal elasticity which prevents cracking or breaking of the belt and untracking due to constant flexing as it passes around pulley wheels or rollers in the apparatus. The metallic belt, which may be of woven cloth, having the longitudinal strands crimped at intervals, does not break down and has a high degree of heat transfer from a heat platen which may be situated underneath the top surface of the belt. Biased roller means may also be provided in the support of the belt to provide a slight degree of biasing to keep the belt under a slight amount of tension, and guide means are also provided for the conveyor roller belt to maintain the belt in proper tracking registry with the biased roller and a power roller which provides drive means for the belt.

In the instant apparatus, relatively unskilled clerks and the like in grocery stores or other retail establishments may wrap objects with a plastic heat shrinkable film and tack the overlapping or fringe edges of film upon the hot or heated loading end of this conveyor belt. The wrapped film is then moved upon the endless conveyor belt through a shrink tunnel, which is provided with a hot air environment by a hot air blowing means. In the shrink tunnel the plastic film is shrunk tightly about the package and the wrapped object is then moved along the conveyor to a discharge station where it is used as desired.

The apparatus is rugged and simple in construction and, through the provision of the special longitudinally elastic belt, operates very simply to transfer heat from the heat platen to the film, which is to be tacked together, so to speak, at the loading station before the film wrapped article is moved through the conveyor shrink tunnel.

The above features are objects of this invention and further objects will appear in the detailed description which follows and will be otherwise apparent to those skilled in the art.

Brief description of the drawings

For the purpose of illustration of this invention, there is shown in the accompanying drawings a preferred embodiment there of. It is to be understood that these drawings are for the purpose of illustration only and that the invention is not limited thereto.

In the drawings:

FIGURE 1 is a top plan view of the heat shrink apparatus;

FIGURE 2 is a view in section of the apparatus, taken on the line 2—2 of FIGURE 1;

FIGURE 3 is a bottom plan view of the apparatus;

FIGURE 4 is an end view of the apparatus taken from the left side of FIGURE 1;

FIGURE 5 is a rear elevational view of the apparatus, the upper portion of the heat tunnel being broken away;

FIGURE 6 is an enlarged bottom plan fragmentary view showing the supporting structure for the end of the driven roller at the rear left side of the apparatus;

FIGURE 7 is a view taken similarly to FIGURE 6 but showing the opposite end of the supporting structure for the driven roller at the front left side of the apparatus;

FIGURE 8 is a view in section taken on line 8—8 of FIGURE 7;

FIGURE 9 is a view in section taken on the line 9—9 of FIGURE 7;

FIGURE 10 is a fragmentary bottom plan view showing an idler roller for guiding the edges of the metallic belt;

FIGURE 11 is an enlarged view in section taken on the line 11—11 of FIGURE 3 showing the belt guiding idler roller construction;

FIGURE 12 is an enlarged fragmentary bottom plan view broken away and partially in section, showing the rear biasing construction for the belt idler roller at the right side of the apparatus;

FIGURE 13 is a view in section taken on the line 13—13 of FIGURE 12;

FIGURE 14 is a view in section taken on the line 14—14 of FIGURE 13;

FIGURE 15 is a view taken similarly to FIGURE 12 but showing the front biasing construction for the belt idler roller at the right side of the apparatus;

FIGURE 16 is a plan view greatly enlarged showing the weave of the metallic belt;

FIGURE 17 is an enlarged plan view of a longitudinal metallic belt;

FIGURE 18 is an enlarged plan view of a lateral metallic strand;

FIGURE 19 is a view in front elevation of the bracket and journal structure used for supporting the rollers of the belt;

FIGURE 20 is a top plan view of the bracket and journal structure; and

FIGURE 21 is a view in side elevation of the bracket and journal structure.

Description of the preferred embodiments

Referring now to the drawings, the heat shrink apparatus of this invention is generally identified by the reference numeral 30 in FIGURES 1 through 5 and, as shown therein, is mounted upon a table 32. The apparatus is provided with a base 34 which is of an open rectangular skeleton frame-like construction and has two end pulley wheels or rollers 36 and 38, the former being a driven roller and the latter being an idled roller held in biasing relation against the inside of an endless conveyor belt 40. (It will be observed that a showing of the belt 40 has been omitted in FIGURES 6, 7, 12 and 15). A motor 41 imparts power to a drive pulley 42, which, through a pulley belt 44 and pulley 45, imparts power to the drive roller 36, as best shown in FIGURES 2, 5 and 7.

The endless belt 40 is provided with three stations at the top surface as shown in FIGURES 1, 2 and 5, the first station being a loading station 46, the second station 48 being provided at an intermediate portion of the top surface and being termed a heat shrink station, and a third station 50 being positioned at the opposite end of the belt and termed a discharge station. Underneath the loading station 46, a heat platen 52 is provided in heat conductive relation with the underneath side of the metallic belt. The heat platen 52 is mounted upon the frame between the top surface and the lower surface of the belt. The heat platen may be electrically energized, as will be well understood, and can be connected to a convenient electrical outlet.

The heat shrinking zone 48 at the intermediate portion of the top surface of the endless belt is provided by means of a heat shrink tunnel 54, as best shown in FIGURES 1, 2 and 4. As there shown, it is comprised of a housing having an inlet opening 56 and an outlet opening 58 provided by curtains 59, which are vertically split to accommodate the movement of the film wrapped object carried through the heat shrink tunnel by means of the endless conveyor belt. A hot air blower 60 is mounted upon the top of the housing to blow hot air into it and to maintain the interior of the heat shrink tunnel at a relatively high temperature to cause the shrinking of the heat shrink film.

The endless conveyor belt 40 is of metallic construction to provide a high rate of heat transfer in order that the heat platen may impart heat to it to provide for tacking of the heat shrink film when the operator places the film wrapped object over the belt at the loading station. The metallic belt may be of woven wire construction or corrosion resistant stainless steel, or the like, as shown in FIGURE 16. Thus, heat can be transferred or passed from the heat platen, through the belt itself, and heat is imparted both by physical contact with the belt and by convection and radiation from the heat platen to aid the tacking and heat shrinking of the film as a wrapped object is placed upon the loading station.

The woven wire belt has longitudinal threads 62 which are crimped at intervals, as shown in FIGURE 17. This provides some degree of elasticity when tension is placed in a longitudinal fashion on the woven wire belt, so that the belt is capable of a slight degree of longitudinal contraction and expansion. The lateral threads are straight, as shown by the reference numeral 64 in FIGURE 18. Stainless steel may be used for the construction of the woven wire belt because of its non-corrosive aspect and relatively high rate of heat transfer, and is desirable for this purpose, although it will be understood that other materials of construction may be employed. The stainless steel is further advantageous in that it may be very simply cleaned and is advantageous in wear and general physical characteristics for the woven wire fabrication.

The base 34, as shown in FIGURES 1 and 3, is comprised of longitudinally extending front and rear braces 64 and 66, respectively. These braces are connected by cross braces at the bottom, designated by the reference numerals 68 and 70. Guide rollers 72 and 74, as shown in FIGURES 3 and 11, are connected to the base at opposite sides thereof and, by means of adjustment screws 76, may be adjusted into proper guiding relation with the side edges of the belt to maintain it in proper registry. The guide rollers are journaled in adjustable brackets 78, which are properly adjusted upon the base by means of the aforementioned adjustment screws.

In order to support the drive roller 36 and the idling roller 38 for the conveyor belt, journal brackets are employed which are shown in FIGURES 19 to 21 and identified by the reference numeral 80. These brackets are provided with a journal 82 which receives a shaft of the respective roller, and an adjustment arm 84. The drive roller 36 is supported, as shown in FIGURES 6, 7, 8 and 9, where it will be seen that a shaft 86 of the drive roller extends through the journal opening of the bracket. Each bracket in turn is adjusted upon the braces 64 and 66 by an adjustment bolt 88 connected to the bracket arm 84 and fitting through an opening 89 in an end plate 90 upon the brace. In this fashion the adjustment arm may be used to properly position the journal bracket to support the drive roller 36.

In like fashion, the idling and biased roller 38 is supported at the opposite ends of the frame by journal brackets 80. However, a long bolt 92 is employed with a biasing spring 94, fitting between the end plate 98 and the head 99 of the belt, as shown in FIGURES 12, 13 and 15, so that biasing pressure is placed upon the idling roller 38. The adjustment bolt 92 is connected to a journal bracket 80 with the shaft 96 of the idling roller passing therethrough. The bolt 92 passes through an end plate 98 from both the front and the rear braces in the same manner as previously described with respect to the end plate 90 for the driven roller 36 of FIGURES 7, 8 and 9. Biasing is effected by the spring 94 fitting between the end plate 98 and the head 99 of the bolt.

*Use*

The portable heat shrink apparatus of this invention is very simply employed. A grocery clerk or other retail clerk first of all obtains the package or article to be wrapped and then tears off from a suitable film dispenser a heat shrinkable sheet of plastic film. An exemplary article to be wrapped is suggested in FIGURE 1 by broken lines, and designated 100. This sheet of film is then placed over the article, and the ends of the film are loosely wrapped together and then physically placed with the overlapping ends bottom down, upon the loading station 46 above the heat platen 52. By contact with the metal belt, and also through the radiant and convective heat passed upwardly by the heat platen, the overlapped edges are tacked together, and the heat causes the shrinking and adherence of the overlapped ends to loosely hold the wrapped film together. Thus the overlapping fringes shrink and cohere together in a loosely tacked together condition caused by the aforementioned factors of physical contact with the heated metallic belt and heat from the heat platen.

The loosely wrapped article 100 is then carried by the endless belt into and through the heat shrink tunnel 54. In the heat shrink tunnel, the hot air provided by the hot air blower 60 causes the film to shrink rapidly and tightly about the article. The wrapped article is then discharged to the end of the conveyor at the discharge station 50.

In the operation the endless conveyor belt 40 is maintained in proper guided relation by the guide rollers 72 and 74, as shown in FIGURES 3 and 11. The biasing action of the biasing spring 94 upon the idler roller 38 maintains the woven wire metallic belt under a slight degree of tension. This action, coupled with the slight longitudinal elasticity of the metallic fabric belt by means of the crimped longitudinal threads, insures that the belt is not only maintained under the proper degree of tension to maintain it in proper registry upon the rollers 36 and 38, but also the longitudinal elasticity of the longitudinal threads of the fabric belt prevent cracking of the belt through the continual bending of the endless belt as it is turned about the rollers.

Various changes and modifications may be made within this invention as will be readily apparent to those skilled in the art. Such changes and modifications are within the scope and teaching of this invention as defined by the claims appended hereto.

What is claimed is:

1. Apparatus for heat shrinking a plastic film wrapped about an object, an endless conveyor means having an endless movable transporting belt, said belt having a slight degree of longitudinal elasticity, being of flexible metallic construction and having a substantial rate of heat transfer, said belt having a top surface with a loading station at one end of said belt, a heat tunnel positioned over an intermediate portion of the top surface of said belt, said heat tunnel being provided with a hot air blower and having inlet and exit means for passing the wrapped object while preventing any substantial loss of heat within said tunnel and means mounting a heat platen underneath the end of the belt at the loading station in heat conductive relation with the top of the belt.

2. The apparatus of claim 1 in which the endless belt is supported in the form of a horizontal loop upon a pair of rollers, one of said rollers being biased against the belt to maintain it under tension and the other roller being power driven.

3. The apparatus of claim 1 in which the belt is comprised of longitudinal metallic strands which have a longitudinal spring action.

4. The apparatus of claim 1 in which the belt is comprised of longitudinal metallic strands which have a longitudinal spring action and the endless belt is supported in the form of a horizontal loop upon a pair of rollers, one of said rollers being biased against the belt to maintain it under tension and the other roller being power driven.

References Cited

UNITED STATES PATENTS

| 2,826,383 | 3/1958 | Spencer | 198—193 XR |
| 3,222,800 | 12/1965 | Siegel et al. | 34—225 XR |
| 3,177,113 | 4/1965 | Golden et al. | 74—239 XR |
| 294,472 | 3/1884 | Jarolimek | 74—239 XR |

KENNETH W. SPRAGUE, *Primary Examiner.*